US012250326B2

(12) United States Patent
Sze et al.

(10) Patent No.: US 12,250,326 B2
(45) Date of Patent: Mar. 11, 2025

(54) CERTIFICATE ENTITLEMENT LICENSES FOR AUTHENTICATING PUBLIC KEY INFRASTRUCTURE CERTIFICATE ENROLLMENT

(71) Applicant: MOTOROLA SOLUTIONS, INC., Chicago, IL (US)

(72) Inventors: Chi Fai Sze, Palatine, IL (US); Andrzej Grzesik, Jaworzno (PL); Chris A. Kruegel, Plainfield, IL (US); Konrad Papierz, Cracow (PL); Steven K. Turner, Cary, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 333 days.

(21) Appl. No.: 17/822,616

(22) Filed: Aug. 26, 2022

(65) Prior Publication Data
US 2024/0073030 A1 Feb. 29, 2024

(51) Int. Cl.
*H04L 29/06* (2006.01)
*H04L 9/08* (2006.01)
*H04L 9/32* (2006.01)

(52) U.S. Cl.
CPC .......... *H04L 9/3263* (2013.01); *H04L 9/0825* (2013.01); *H04L 9/0861* (2013.01)

(58) Field of Classification Search
CPC ... H04L 9/3263; H04L 9/0825; H04L 9/0861; H04L 63/0823; H04L 9/3268
See application file for complete search history.

(56) References Cited

U.S. PATENT DOCUMENTS

| 7,676,846 | B2 * | 3/2010 | Robert | ................ H04L 63/0823 713/172 |
| 9,100,390 | B1 * | 8/2015 | Asnis | ................ H04M 15/8228 |

(Continued)

FOREIGN PATENT DOCUMENTS

| WO | 2013177069 A1 | 11/2013 |
| WO | 2015000795 A1 | 1/2015 |
| WO | 2020014024 A1 | 1/2020 |

OTHER PUBLICATIONS

Microsoft, "[MS-OTPCE]: One-Time Password Certificate Enrollment Protocol," <https://docs.microsoft.com/en-us/openspecs/windows_protocols/ms-otpce/ee24c2ea-12bf-4d17-b8a1-0f5d2e178f59> dated Jun. 24, 2021 (4 pages).

(Continued)

*Primary Examiner* — Mahfuzur Rahman
(74) *Attorney, Agent, or Firm* — Michael Best & Friedrich LLP (57) ABSTRACT

Systems and methods for authenticating public key infrastructure certificate enrollment using certificate entitlement licenses. One example system includes a device manager including an electronic processor. The electronic processor is configured to receive a request for software for an electronic device including a unique electronic device identifier. The electronic processor is configured to determine, based on the request, whether the electronic device is entitled to participate in a certificate management service. The electronic processor is configured to, responsive to determining that the electronic device is entitled to participate in a certificate management service, transmit a certificate entitlement license request including the unique device identifier to a certificate entitlement license manager. The electronic processor is configured to receive, from the certificate entitlement license manager, a certificate entitlement license for the unique device identifier. The electronic pro- (Continued)

cessor is configured to deliver the certificate entitlement license based on the unique device identifier.

17 Claims, 6 Drawing Sheets

(56) References Cited

U.S. PATENT DOCUMENTS

| | | | |
|---|---|---|---|
| 9,781,098 | B2 | 10/2017 | Mohamad Abdul et al. |
| 10,015,143 | B1* | 7/2018 | Ferguson .............. G06F 21/105 |
| 10,867,014 | B2 | 12/2020 | Brockhaus et al. |
| 11,050,605 | B2* | 6/2021 | Gulati ................... H04L 9/0897 |
| 11,139,989 | B2 | 10/2021 | Kruegel et al. |
| 2017/0116693 | A1* | 4/2017 | Rae ....................... G06Q 50/184 |
| 2019/0213633 | A1* | 7/2019 | Kokernak .......... G06Q 30/0277 |
| 2019/0236214 | A1* | 8/2019 | Kokernak ............ H04N 21/478 |
| 2020/0252409 | A1* | 8/2020 | Fynaardt ............... H04L 63/123 |
| 2020/0396610 | A1 | 12/2020 | Turner et al. |
| 2021/0119992 | A1* | 4/2021 | Johnson .................. G06F 16/22 |
| 2021/0248338 | A1* | 8/2021 | Spivack ............. G06K 7/10831 |
| 2024/0073030 | A1* | 2/2024 | Sze ....................... H04L 9/0825 |
| 2024/0095315 | A1* | 3/2024 | Bartfai-Walcott .... G06F 21/107 |

OTHER PUBLICATIONS

International Search Report and Written Opinion for Application No. PCT/US2023/071001, dated Oct. 30, 2023 (16 pages).

Liu et al., "SCEP: The Simple Certificate Enrollment Protocol," Cisco Systems, Jan. 2000 (36 pages).

Mota, "Secure Certificate Management and Device Enrollment at IoT Scale," Aalto Univeristy School of Science Master's Thesis, 2016 (78 pages).

* cited by examiner

CERTIFICATE ENTITLEMENT LICENSES FOR AUTHENTICATING PUBLIC KEY INFRASTRUCTURE CERTIFICATE ENROLLMENT

BACKGROUND OF THE INVENTION

Public safety and other organizations provide communications and access to software services to computers and digital radios via digital communications networks. Some systems use a public key infrastructure (PKI) to manage distribution of digital certificates to control access to the communications and software services and encrypt communications.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments, examples, aspects, and features of concepts that include the claimed subject matter and explain various principles and advantages of those embodiments, examples, aspects, and features.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of examples, aspects, and features illustrated.

In some instances, the apparatus and method components have been represented where appropriate by conventional symbols in the drawings, showing only those specific details that are pertinent to understanding the of various embodiments, examples, aspects, and features so as not to obscure the disclosure with details that will be readily apparent to those of ordinary skill in the art having the benefit of the description herein.

DETAILED DESCRIPTION OF THE INVENTION

As noted, some communication and computing systems use a public key infrastructure (PKI) to manage distribution of digital certificates used to control access. In some networks, the PKI is used to deploy authenticated onboarding solutions (for example, certificate enrollment) for newly manufactured radios with automated PKI certificate management services and workflows.

However, there are many more existing radios already in the market which are not configured from the factory with the automated PKI certificate management services and workflows. While many such networks may include equipment sourced from a single provider, customers increasingly demand access for the secure services on their own or third-party devices, an architecture known as bring your own device (BYOD).

To address these problems, some systems use a one-time enrollment code (OTEC). However, such codes are not tied to a specific device. Any device having the OTEC will be able to get certificates from a PKI. This is undesirable in environments where identity verification is essential to providing secure access. Other solutions, such as manually generating and loading PKI certificates for each legacy and BYOD device, are time consuming and inefficient. Furthermore, mistakes in deployment could lead to devices gaining unauthorized yet authenticated access to networks and services.

To address, among other things, these technical problems with current technology, systems and methods are provided herein for authenticating public key infrastructure certificate enrollment using certificate entitlement licenses. Among other things, examples and aspects presented herein provide an authenticated secure onboarding solution, which enables legacy (that is, fielded) radios as well as BYOD devices to automate the PKI certificate management services, including certificate enrollment.

Embodiments and aspects presented herein provide for a certificate entitlement license, which is produced by the PKI or its authorized agent for use by a specific device to automatically authenticate the device prior to or during the certificate enrollment process. Using examples presented herein, a device, attempting to access a network or software service, contacts a device manager. The device manager, after determining that the particular device is entitled to participate in certificate management services for the network or a software service, requests a certificate entitlement license from the PKI or its authorized agent for the device. The PKI or its authorized agent provides a certificate entitlement license specific to that device, which in turn uses the certificate entitlement license to derive a signing key used to sign a certificate management message sent to the PKI. The PKI uses the certificate entitlement license and device identity information to generate and provide public key certificates to the device. Because a certificate entitlement license is tied to a specific verified device (for example, by integrating a specific device identifier into the license), only certificates to which the device is entitled will be provided to that device.

By increasing security and automating authentication of certificate enrollment, the embodiments and aspects provided herein improve the functioning of their respective computing and communications environments, as well as the individual components that make up those environments.

One example embodiment provides a system for authenticating public key infrastructure certificate enrollment using certificate entitlement licenses. The system includes a device manager including an electronic processor. The electronic processor is configured to receive a request for software for an electronic device including a unique electronic device identifier. The electronic processor is configured to determine, based on the request, whether the electronic device is entitled to participate in a certificate management service. The electronic processor is configured to, responsive to determining that the electronic device is entitled to participate in a certificate management service, transmit a certificate entitlement license request including the unique device identifier to a certificate entitlement license manager. The electronic processor is configured to receive, from the certificate entitlement license manager, a certificate entitlement license for the unique device identifier. The electronic processor is configured to deliver the certificate entitlement license based on the unique device identifier.

Another example embodiment provides a method for authenticating public key infrastructure certificate enrollment using certificate entitlement licenses. The method includes receiving, at a device manager, a request for software for an electronic device including a unique electronic device identifier. The method includes determining, with the device manager, based on the request, whether the electronic device is entitled to participate in a certificate management service. The method includes, responsive to determining that the electronic device is entitled to participate in a certificate management service, transmitting a certificate entitlement license request including the unique device identifier to a certificate entitlement license manager. The method includes receiving, from the certificate entitlement license manager, a certificate entitlement license for the unique device identifier. The method includes delivering, with the device manager, the certificate entitlement license based on the unique device identifier.

Another example embodiment provides a device for authenticating public key infrastructure certificate enrollment using certificate entitlement licenses. The device includes an electronic processor. The electronic processor is configured to receive, via an application programming interface, a certificate entitlement license request including a unique device identifier and a device type. The electronic processor is configured to validate the certificate entitlement license request based on the device type. The electronic processor is configured to, responsive to validating the certificate entitlement license request, generate a certificate entitlement license for the unique device identifier. The electronic processor is configured to transmit, via the application programming interface, the certificate entitlement license based on the unique device identifier.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

It should be understood that although certain figures presented herein illustrate hardware and software located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Figure 1:
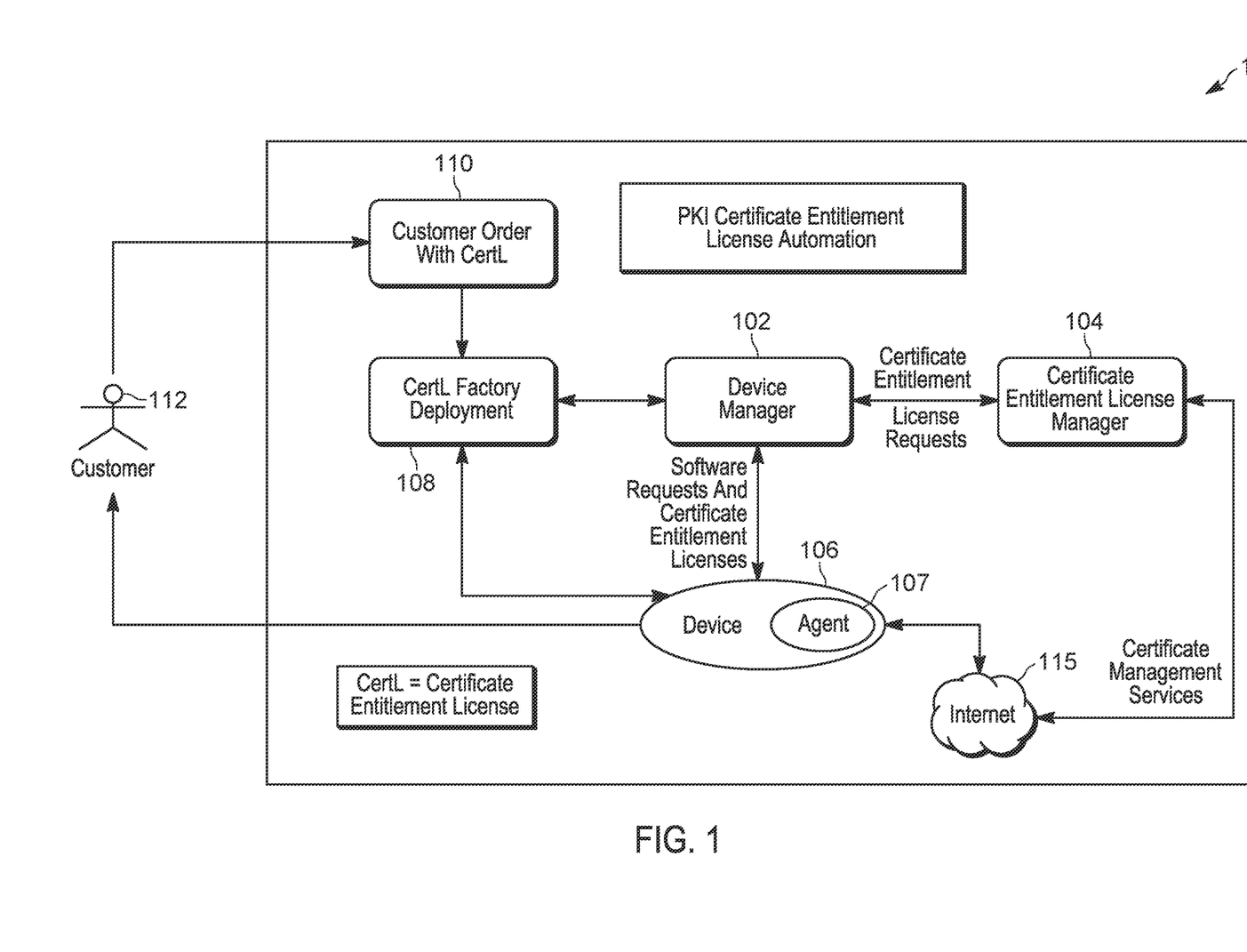
FIG. 1 illustrates a system for authenticating public key infrastructure certificate enrollment using certificate entitlement licenses in accordance with some examples.

FIG. 1 is a diagram of an example system 100, which is configured to, among other things, authenticate public key infrastructure certificate enrollment using certificate entitlement licenses, as described herein. In the example illustrated, the system 100 includes a device manager 102, a certificate entitlement license manager 104, and a device 106. The components of the system 100 are communicatively coupled to one another by, for example, the internet 115 and one or more communications networks (not shown) and network connections. An example communications network includes wireless connections, wired connections, or combinations of both. A suitable communications network may be implemented using various local and wide area networks, for example, a Bluetooth™ network, a Wi-Fi™ network, the Internet, a land mobile radio network, a cellular data network (for example, a Long Term Evolution (LTE) network, a 5G network, and the like) or combinations or derivatives thereof.

In some instances, the system 100 is or is implemented by a cloud computing environment. In some instances, the components of the system 100 may be distributed among multiple locations and communicatively coupled to one another via one or more communications networks.

In some instances, the device manager 102 and certificate entitlement license manager 104 may be virtual systems implemented on one or more network attached computers, which work together as if they are a single more powerful machine. In some instances, the device manager 102 and certificate entitlement license manager 104 are each implemented on a separate computer or group of computers. One example of the device manager 102 is described more particularly with respect to FIG. 2. Instances of the certificate entitlement license manager 104 may include similar components and may be configured similarly to provide similar computing functionality.

As described more particularly herein, the device manager 102 receives a request for software from the device 106. The device manager 102, in some instances, queries a factory deployment server 108 to determine whether a customer order 110 (for example, placed by a customer 112) entitles the device 106 to participate in certificate management services (for example, as provided by certificate entitlement license manager 104).

The certificate entitlement license manager 104, as described herein, provides a public key infrastructure, which includes the capability to grant certificate entitlement licenses and provide certificate enrollment to devices based on the certificate entitlement licenses.

As illustrated in FIG. 1, when the device 106 is entitled to participate in certificate management services, the device manager 102 requests a certificate entitlement license for the device 106 from the certificate entitlement license manager 104. In some instances, the certificate entitlement license manager 104 authenticates the requests from the device manager 102 prior to fulfilling them.

The device 106 receives the certificate entitlement license from the device manager 102 and, as described herein, uses the certificate entitlement license to participate in certificate management services with the certificate entitlement license manager 104. In some instances, the device 106 is a portable digital radio (for example, one of the Motorola APX™ line of radios). In other instances, the device 106 is a smart telephone, a converged device, a tablet computer, a laptop computer, or other computing device configured to operate as described herein. Although FIG. 1 illustrates only a single device 106, the methods described herein are applicable to instances of the system 100 implementing tens, hundreds, or thousands of such devices.

Figure 2:
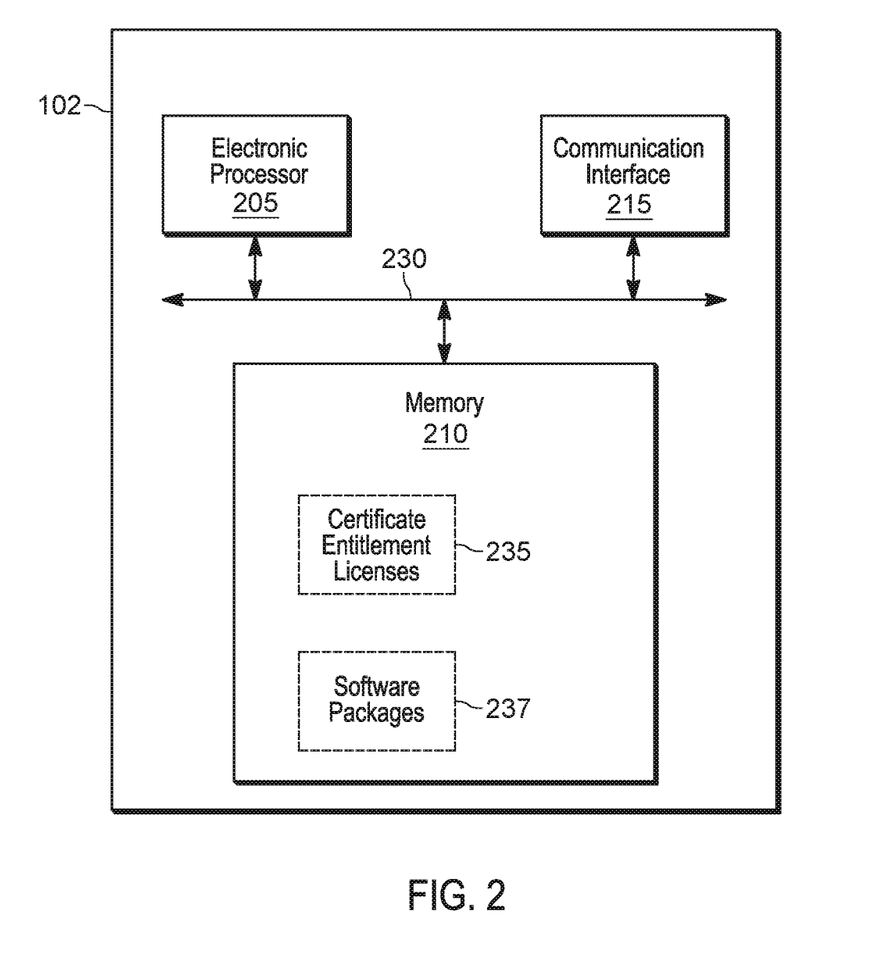
FIG. 2 schematically illustrates a device manager of the system of FIG. 1 in accordance with some examples.

FIG. 2 schematically illustrates one example of the device manager 102. In the example provided, the device manager 102 includes an electronic processor 205, a memory 210, and a communication interface 215. Although illustrated and described by way of example with a single electronic processor, instances of the device manager 102 may include multiple electronic processors. The illustrated components, along with other various modules and components (not shown) are coupled to each other by or through one or more control or data buses (for example, a communication bus 230) that enable communication therebetween.

The electronic processor 205 obtains and provides information (for example, from the memory 210 and/or the communication interface 215) and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions.

The memory 210 can include a program storage area and a data storage area. The program storage area and the data storage area can include combinations of distinct types of memory, as described herein. The electronic processor 205 is configured to retrieve from the memory 210 and execute, among other things, software to carry out the methods described herein. As illustrated in FIG. 2, the memory 210 may store certificate entitlement licenses 235 and software packages 237 (for use with one or more devices 106), both of which are described in detail herein.

The communication interface 215 is an electronic communication interface configured to receive input and to provide system output. The communication interface 215 obtains information and signals from, and provides information and signals to, (for example, over one or more wired and/or wireless connections) devices both internal and external to the device manager 102. The communication interface 215 may include a wireless transmitter or transceiver for wirelessly communicating over one or more communications networks. Alternatively, or in addition to a wireless transmitter or transceiver, the communication interface 215 may include a port for receiving a cable, such as an Ethernet cable, for communicating over a communications network or a dedicated wired connection. It should be understood that, in some embodiments, the device manager 102 communicates with other devices through one or more intermediary devices, such as routers, gateways, relays, and the like.

Figure 3:
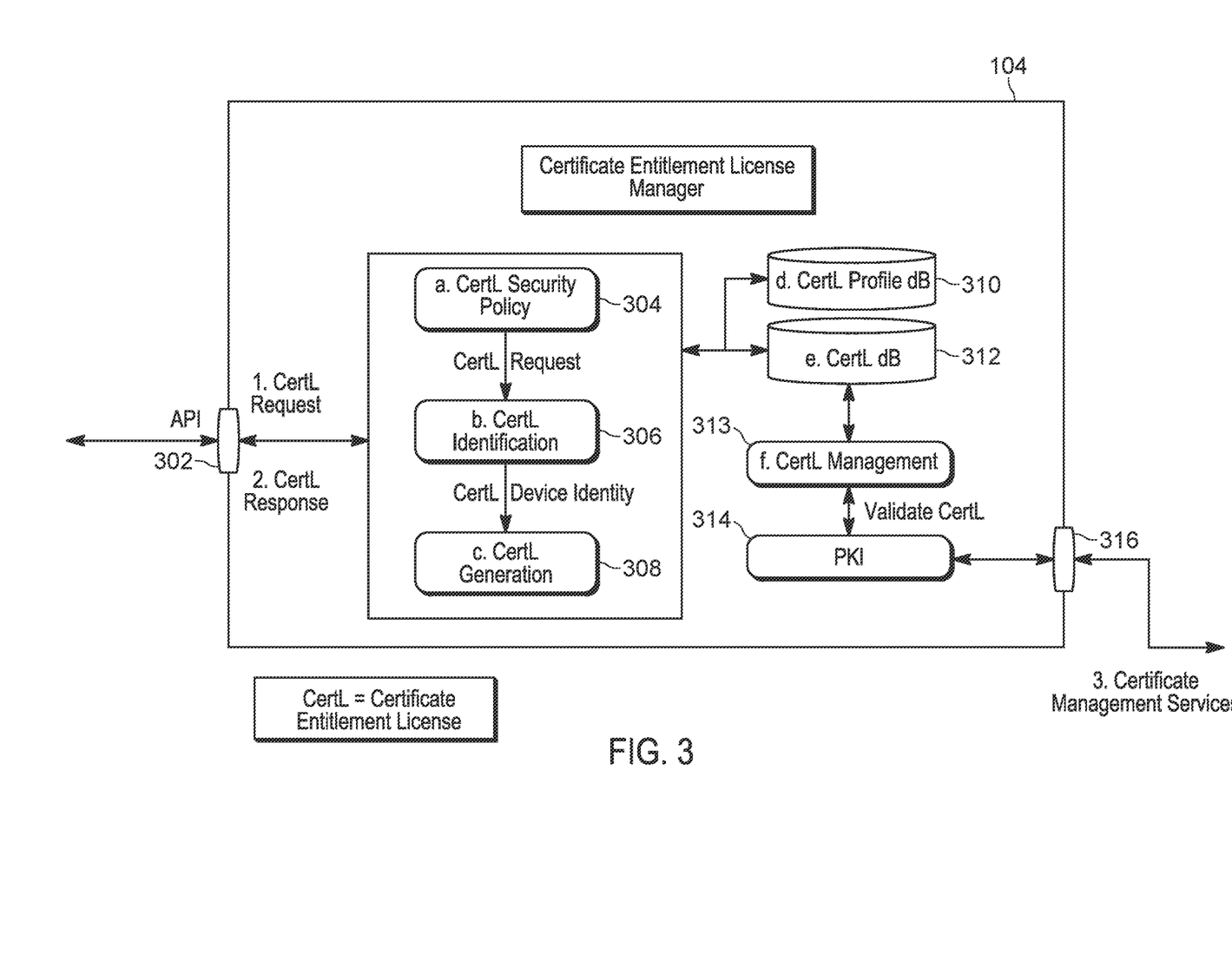
FIG. 3 schematically illustrates a certificate entitlement license manager of the system of FIG. 1 in accordance with some examples.

FIG. 3 schematically illustrates aspects of the certificate entitlement license manager 104. In some instances, the certificate entitlement license manager 104 is a separate entity providing certificate entitlement license management services and interfaces with an external public key infrastructure certificate manager. In some instances, the certificate entitlement license manager 104 is integrated with a public key infrastructure certificate manager. As illustrated in FIG. 3, the certificate entitlement license manager 104 includes a plurality of software functions and data stores, which work together to provide certificate entitlement license management services, as described herein.

In the illustrated example, the certificate entitlement license manager 104 includes an application programming interface (API) 302, a certificate entitlement license security policy function 304, a certificate entitlement license identification function 306, a certificate entitlement license generation function 308, a certificate entitlement license profile database 310, a certificate entitlement license database 312, a certificate entitlement license management function 313, a public key infrastructure (PKI) 314, and a certificate management interface 316.

The API 302 provides communication to and from the other components of the system 100, including the device manager 102. In some instances, the API 302 is a representational state transfer (REST) API.

The certificate entitlement license security policy function 304 validates the credential and access permissions to ensure that only trusted devices or device managers can request a certificate entitlement license. The certificate entitlement license security policy function 304 performs two types of validations. In one aspect the certificate entitlement license security policy function 304 validates the credentials of the device manager requesting a certificate entitlement license. In another aspect, the certificate entitlement license security policy function 304 validates device identifiers and types against, for example, a deny list maintained within the public key infrastructure 314.

The certificate entitlement license identification function 306 validates the certificate entitlement license request messages. In one instance, the certificate entitlement license identification function 306 uses the device type from a request message to map the request to allowed policies for the device type.

The certificate entitlement license generation function 308 issues a single use and time limited certificate entitlement license for a requested and validated device identity. In some instances, the certificate entitlement license generation function 308 issues a multi-use certificate entitlement license (e.g., a license, which may be used up to three times). In some instances, the certificate entitlement license generation function 308 issues certificate entitlement license that is permanent (i.e., not time-limited).

The certificate entitlement license profile database 310 stores a known set of configurable certificate entitlement license profiles for devices. Profiles specify, among other things, which device types are allowed access to which networks and services. In some aspects, profiles specify simply whether or not a particular device or device type is allowed a certificate entitlement license.

The certificate entitlement license database 312 stores certificate entitlement licenses generated by the certificate entitlement license generation function 308.

The certificate entitlement license management function 313 validates device identity, expiration time, and usage status of the certificate entitlement licenses identified for use with certificate management messages received at the usage interface (the certificate management interface 316). In some instances, validation is performed on a signature contained in the received certificate management message. For example, when the public key infrastructure 314 receives a certificate management message signed using a certificate entitlement license, it sends the certificate management message to the certificate entitlement license management function 313 for validation. The certificate entitlement license management function 313 extracts, from the certificate management message, the certificate entitlement license identifier and uses the certificate entitlement license identifier to retrieve, from the certificate entitlement license database 312, the certificate entitlement license value for the certificate entitlement license identified by the certificate entitlement license identifier. The certificate entitlement license management function 313 inputs the certificate entitlement license value to the key derivation function to generate a signing key that is used to generate a signature for the received certificate management message. The certificate entitlement license management function 313 then validates the received certificate management message by comparing the generated signature with the signature contained in the received certificate management message.

In some instances, a duplicate request may be received for a certificate entitlement license for the same device identifier from the device manager. In some instances, where the certificate entitlement license has not expired, the expiration time for the certificate entitlement license may be extended. In some instances, the expiration time may only be extended a certain number of times or up to a certain date, for example, as specified in the profile for the particular device or device type.

In some instances, for example, where a duplicate request is received for the same device and a certificate entitlement license has already been issued for the device, the request is denied. In some instances, where a duplicate request is received and a certificate entitlement license has already been issued for the device, a new certificate entitlement license may be generated, based on an applicable profile.

The public key infrastructure 314 authenticates and authorizes the certificate management messages (for example, certificate signing requests). As noted, when the public key infrastructure 314 receives certificate management messages authenticated using a certificate entitlement license, the public key infrastructure 314 requests validation of the received certificate management messages by the certificate entitlement license management function 313.

The certificate management interface 316 sends and receives certificate management messages.

Figure 4:
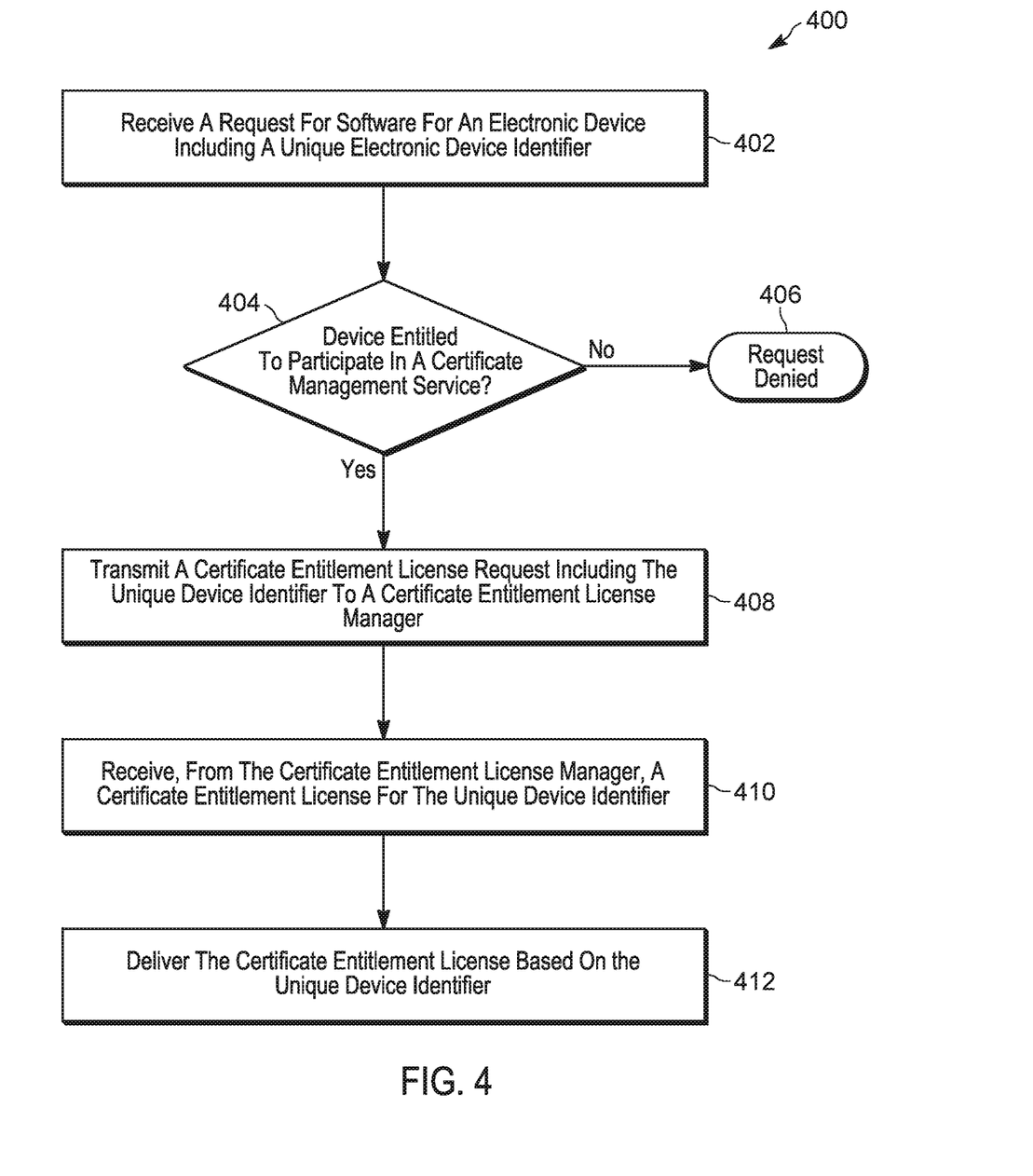
FIG. 4 is a flowchart illustrating a method for authenticating public key infrastructure certificate enrollment using certificate entitlement licenses in accordance with some examples.

FIG. 4 illustrates an example method 400 for authenticating public key infrastructure certificate enrollment using certificate entitlement licenses. Although the method 400 is described in conjunction with the system 100 as described herein, the method 400 could be used with other systems and devices. In addition, the method 400 may be modified or performed differently than the example provided.

As an example, the method 400 is described as being performed by the device manager 102 (and thus it is also performed by one or more electronic processors of the computer(s) executing the device manager 102). However, it should be understood that, in some examples, portions of the method 400 may be performed by other components, including for example, the device 106 and the certificate entitlement license manager 104. For ease of description, the method 400 is described in terms of a single device. However, the method 400 may be used across multiple components and networks to authenticate multiple devices.

At block 402, the device manager 102 receives a request for software for an electronic device 106 including a unique electronic device identifier. The unique device identifier includes an identification number (or alphanumeric sequence) for the device and a type for the device. In one example, the request for software is generated by an electronic device connect service. In some instances, (for example, the agent 107 illustrated in FIG. 1) the electronic device connect service is internal to the electronic device 106. In some instances, the software request is a request by the electronic device 106 (for example, a BYOD device) to access an external software service. For example, a BYOD server may be loaded with system management software, which attempts to register to a server within the system to access management systems. In some instances (for example, the electronic device connect service 109 illustrated in FIG. 5), the electronic device connect service is external to the electronic device 106 and the request for software is generated on behalf of the electronic device 106 by the electronic device connect service. For example, the electronic device connect service may query the electronic device 106 for, among other things, its current software version, and request, on behalf of the device, a software package from the device manager 102. In another example, a digital portable radio may boot up and request, through an electronic device connect service, a software package to allow it to operate on a particular communications network.

At block 404, the device manager 102 determines, based on the request, whether the electronic device 106 is entitled to participate in a certificate management service. In some aspects, the device manager 102 determines whether the electronic device 106 is in need of certificates from a PKI (for example, if the device, as part of a software download, also needs to enroll for PKI certificates). In some instances, the device manager 102 may message a factory deployment server 108 to verify that the electronic device 106 has a valid order entitling its participation in certificate management services. In some instances, the entitlement may be part of the software request. For example, in the case of a BYOD device, the software installed may include the entitlement.

Where the device manager 102 determines (at block 404) that the electronic device 106 is not entitled to participate in the certificate management service, the request is denied at block 406. For example, an electronic message may be sent to the electronic device 106, or another device making the request on behalf of the electronic device 106, that the request has been denied.

Responsive to determining that the electronic device 106 is entitled to participate in a certificate management service (by whatever means) (at block 404), the device manager 102, at block 408, transmits a certificate entitlement license request including the unique device identifier to the certificate entitlement license manager 104. For example, the device manager 102 may interact with the API 302 to send the certificate entitlement license request. In some instances, the certificate entitlement license request includes a device type for the electronic device 106 and/or one or more service types identifying the services for which the device is entitled to obtain PKI certificates.

At block 410, the device manager 102 receives from the certificate entitlement license manager 104, a certificate entitlement license for the unique device identifier. In some instances, the device manager 102 receives, via the API 302, a certificate entitlement license response message that includes a certificate entitlement license identifier (a unique alphanumeric identifier for the license), a certificate entitlement license value (for example, an alphanumeric string), a certificate entitlement license validity period (a time period during which the license may be used), the unique device identifier, the device type, and a message checksum (used to verify the integrity of the message). In some instances, some or all of the contents of the certificate entitlement license response message are encrypted to provide confidentiality all the way to the electronic device 106. In some instances, the certificate license entitlement value is used to sign certificate management messages, as described herein. In some instances, the certificate license entitlement value may be used as an input to a key derivation function to derive a signing key that may be used to sign certificate management messages. In one aspect, the derivation function is known only to the certificate entitlement license manager 104 and the device 106 (for example, it may be included in a software package that gets delivered to the device along with the certificate entitlement license).

The certificate entitlement license manager 104 generates the certificate entitlement license for the unique device identifier responsive to receiving the certificate entitlement license request from the device manager 102. For example, as illustrated in FIG. 3, the certificate entitlement license manager 104 receives, via the application programming interface 302, the certificate entitlement license request (including the unique device identifier and the device type). The certificate entitlement license security policy function 304 and the certificate entitlement license identification function 306 validate the certificate entitlement license request based on the device type. In one example, the certificate entitlement license identification function 306 validates the request by mapping the device type to one or more allowed policies for the device type. Responsive to validating the certificate entitlement license request, the certificate entitlement license generation function 308 generates the certificate entitlement license for the unique device identifier. The certificate entitlement license manager 104 transmits, via the application programming interface 302, the certificate entitlement license to the device manager 102. As noted above, in some instances, the certificate entitlement license manager 104 transmits the certificate entitlement license by transmitting a certificate entitlement license response message that includes a certificate entitlement license identifier, a certificate entitlement license value, a certificate entitlement license validity period, the unique device identifier, the device type, and a message checksum.

Returning to FIG. 4, at block 412, the device manager 102 delivers the certificate entitlement license based on the unique device identifier. In some instances, the device manager 102 delivers the certificate entitlement license by transmitting a secure software package including the certificate entitlement license to the electronic device 106. For example, where a digital radio, or a device connect service on behalf of the digital radio, initiates the software request by requesting a software update, the secure software package may be the software update with the certificate entitlement license information embedded in it. In some instances, just the certificate entitlement license is transmitted to the electronic device 106.

After the electronic device 106 has the certificate entitlement license, it is able to participate in certificate management services. In one example, described with respect to FIG. 3, the certificate entitlement license manager 104 receives from the electronic device 106, a certificate request including a certificate entitlement license identifier associated with the certificate entitlement license, the unique device identifier, and a device type for the electronic device 106. In some instances, the certificate request is a certificate management message signed using the device public key. In some instances, the certificate request is a certificate signing request signed using the device public key. In some instances, the certificate request is signed using the certificate entitlement license value. In some instances, the certificate request is signed with a key derived from information in the certificate entitlement license (for example, the certificate entitlement license value) using the key derivation function as described herein.

In response to receiving the certificate request, the certificate entitlement license manager 104 validates the certificate request based on the certificate entitlement license identifier and the unique device identifier (for example, using the certificate entitlement license management function 313). Responsive to validating the certificate request, the certificate entitlement license manager 104 generates a public key certificate based on a profile associated with the device type and the certificate entitlement license identifier (for example, provided by the certificate entitlement license profile database 310). In some instances, the certificate request also includes a service type, and the profile is associated with the device type and the service type. In some instances, the profile is associated with the device type and the service type and the method of enrollment (for example, enrollment using a certificate entitlement license). The certificate entitlement license manager 104 transmits the public key certificate to the electronic device 106.

Figure 5:
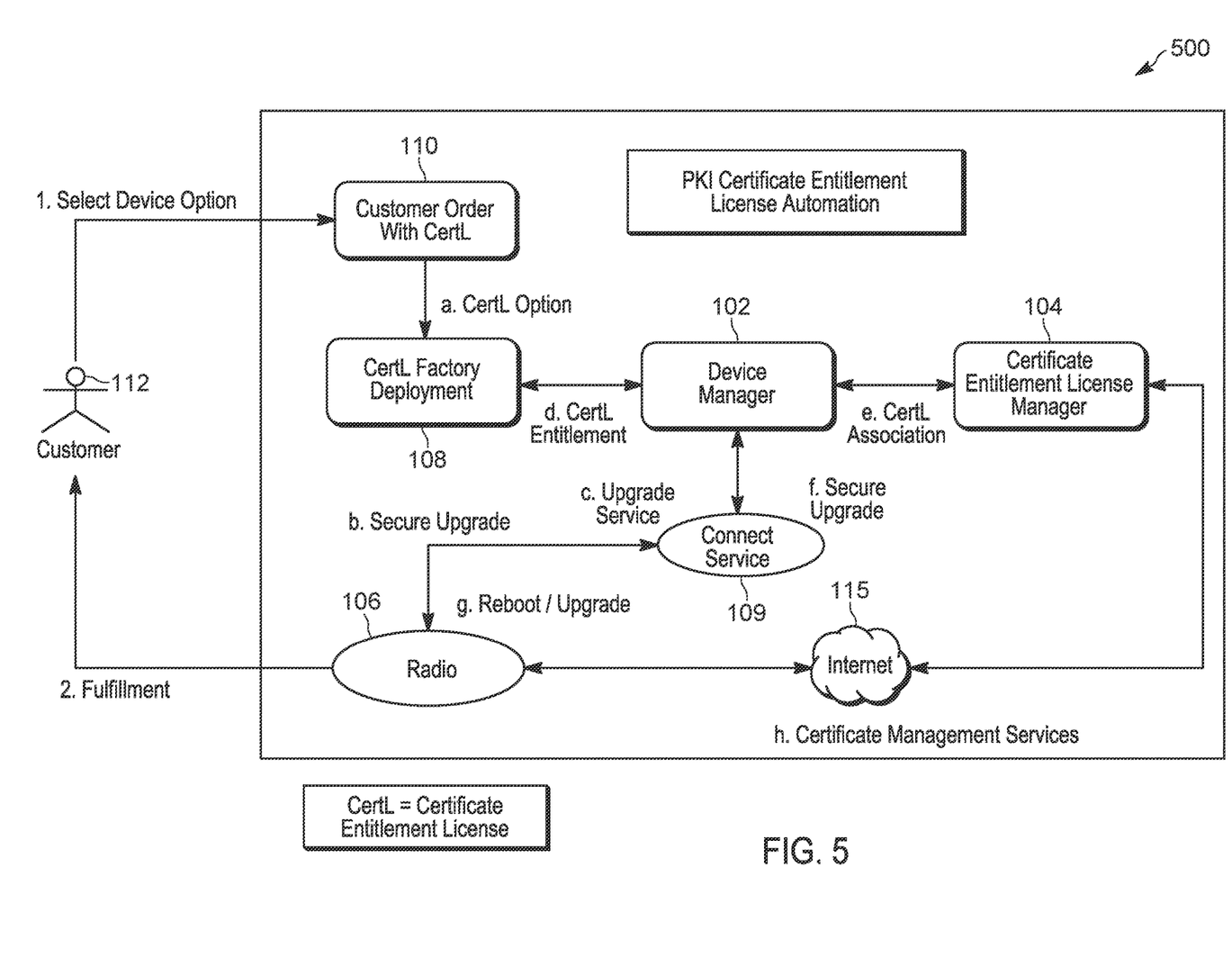
FIG. 5 illustrates a system for authenticating public key infrastructure certificate enrollment for portable radios using certificate entitlement licenses in accordance with some examples.

FIG. 5 illustrates an alternative example system 500 (a variant of the system 100). In the system 500, a customer 112 orders a certificate entitlement license option for a legacy APX™ radio (device 106). (a) The customer order 110 is processed and the factory deployment server 108 is provided with the order information. (b) The legacy radio (device 106) is attached to the electronic device connect service 109 for (c) secure software upgrade in the field. The device manager 102 determines if the electronic device 106 is authorized for a software upgrade and/or certificate management service by contacting the factory deployment server 108, which issues a certificate entitlement license entitlement (d) based on the customer purchase order 110. (e) The device manager 102 uses a unique device identifier and the individual certificate entitlement license entitlement to request a certificate entitlement license from the certificate entitlement license manager 104. (f) The device manager 102 generates a secure software upgrade package including the certificate entitlement license. (g) The device manager 102 and the electronic device connect service 109 deliver the software upgrade package and, in some instances, the device 106 reboots. (h) The device 106 automatically enrolls for a PKI certificate using the certificate entitlement license as the authentication credential, as described above.

Figure 6:
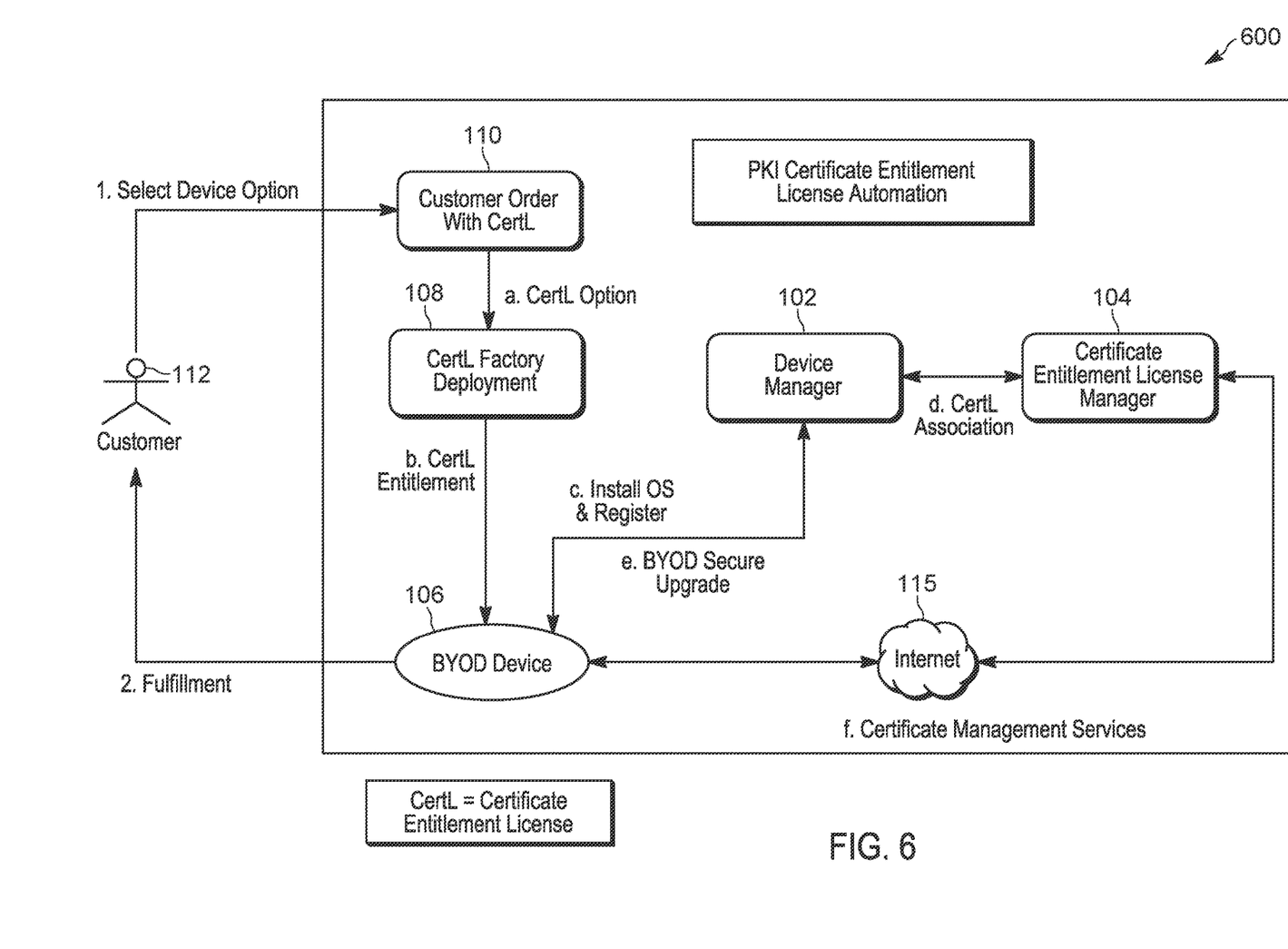
FIG. 6 illustrates a system for authenticating public key infrastructure certificate enrollment for external computing devices using certificate entitlement licenses in accordance with some examples.

FIG. 6 illustrates an alternative example system 600 (a variant of the system 100). In the system 600, a customer 112 orders software with the certificate entitlement license option for a BYOD device (the device 106). (a) The customer order 110 is processed and the factory deployment server 108 is provided with the order information. The factory deployment server 108 issues a certificate entitlement license entitlement (b) based on the customer purchase order 110. (c) In one example, a customer installs the device operating system and registers the device 106 to the device manager 102. (d) The device manager 102 uses the unique device identifier and the individual certificate entitlement license entitlement to request a certificate entitlement license from the certificate entitlement license manager 104. (e) The device manager 102 downloads a secure software update package including the certificate entitlement license. (f) The electronic device 106 automatically enrolls for a PKI certificate using the certificate entitlement license as the authentication credential, as described above.

In the foregoing specification, specific examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A system for authenticating public key infrastructure certificate enrollment, the system comprising:
   a device manager including an electronic processor configured to:
   receive a request for access to an external software service, the request being generated by an electronic device connect service on behalf of an electronic device, the request including a unique electronic device identifier;
   determine, based on the request, whether the electronic device is entitled to participate in the certificate management service;
   responsive to determining that the electronic device is entitled to participate in a certificate management service, transmit a certificate entitlement license request including the unique device identifier to a certificate entitlement license manager;
   receive, from the certificate entitlement license manager, a certificate entitlement license for the unique device identifier; and
   deliver the certificate entitlement license based on the unique device identifier;
   wherein the electronic device connect service is either internal or external to the electronic device.

2. The system of claim 1, wherein delivering the certificate entitlement license includes transmitting a secure software package including the certificate entitlement license to the electronic device.

3. The system of claim 1, further comprising:
   the certificate entitlement license manager;
   wherein the certificate entitlement license manager includes a second electronic processor configured to, responsive to receiving the certificate entitlement license request, generate the certificate entitlement license for the unique device identifier.

4. The system of claim 3, wherein the second electronic processor is further configured to:
   receive, from the electronic device, a certificate request including a certificate entitlement license identifier associated with the certificate entitlement license, the unique device identifier, and a device type for the electronic device;
   validate the certificate request based on the certificate entitlement license identifier and the unique device identifier;
   responsive to validating the certificate request, generate a public key certificate based on a profile associated with the device type and the certificate request; and
   transmit, to the electronic device, the public key certificate.

5. The system of claim 4, wherein:
the certificate request further includes a service type; and
the electronic processor is further configured to generate the public key certificate based on a profile associated with the device type and the service type.

6. The system of claim 1, wherein:
wherein delivering the certificate entitlement license includes delivering at least one selected from a group consisting of a certificate entitlement license identifier, a certificate entitlement license value, a certificate entitlement license validity period, the unique device identifier, and a device type for the electronic device.

7. The system of claim 1, wherein the certificate entitlement license request further includes at least one selected from a group consisting of a device type and a service type.

8. A method for authenticating public key infrastructure certificate enrollment comprising:
receiving, at a device manager, a request for access to an external software service, the request being generated by an electronic device connect service on behalf of an electronic device, the request including a unique electronic device identifier;
determining, with the device manager, based on the request, whether the electronic device is entitled to participate in a certificate management service;
responsive to determining that the electronic device is entitled to participate in the certificate management service, transmitting a certificate entitlement license request including the unique device identifier to a certificate entitlement license manager;
receiving, from the certificate entitlement license manager, a certificate entitlement license for the unique device identifier; and
delivering, with the device manager, the certificate entitlement license based on the unique device identifier;
wherein the electronic device connect service is either internal or external to the electronic device.

9. The method of claim 8, further comprising:
wherein delivering the certificate entitlement license includes generating, based on the unique device identifier, a secure software package including the certificate entitlement license; and
transmitting the secure software package to the electronic device.

10. The method of claim 8, further comprising:
generating, with the certificate entitlement license manager, a certificate entitlement license for the unique device identifier in response to receiving the certificate entitlement license request.

11. The method of claim 8, further comprising:
receiving, by the certificate entitlement license manager from the electronic device, a certificate request including a certificate entitlement license identifier associated with the certificate entitlement license, the unique device identifier, and a device type for the electronic device;
validating, with the certificate entitlement license manager, the certificate request based on the certificate entitlement license identifier and the unique device identifier;
responsive to validating the certificate request, generating a public key certificate based on a profile associated with the device type and the certificate request; and
transmitting, to the electronic device, the public key certificate.

12. The method of claim 11, further comprising:
generating the public key certificate based on a profile associated with the device type and a service type.

13. The method of claim 8, wherein:
wherein delivering the certificate entitlement license includes delivering at least one selected from a group consisting of a certificate entitlement license identifier, a certificate entitlement license value, a certificate entitlement license validity period, the unique device identifier, and a device type for the electronic device.

14. The method of claim 8, wherein the certificate entitlement license request further includes at least one selected from a group consisting of a device type and a service type.

15. A device comprising:
an electronic processor configured to:
receive, via an application programming interface, a certificate entitlement license request including a unique device identifier identifying an electronic device and a device type for the electronic device;
validate the certificate entitlement license request based on the device type;
responsive to validating the certificate entitlement license request, generate a certificate entitlement license for the unique device identifier;
transmit, via the application programming interface, the certificate entitlement license based on the unique device identifier;
receive, from the electronic device, a certificate request including certificate entitlement license identifier associated with the certificate entitlement license, the unique device identifier, and a device type for the electronic device;
validate the certificate request based on the certificate entitlement license identifier and the unique device identifier;
responsive to validating the certificate request, generate a public key certificate based on a profile associated with the device type and the certificate entitlement license identifier; and
transmit, to the electronic device, the public key certificate.

16. The device of claim 15, wherein:
the certificate request further includes a service type; and
the electronic processor is further configured to generate the public key certificate based on a profile associated with the device type, the certificate entitlement license identifier, and the service type.

17. The device of claim 15, wherein the electronic processor is further configured to transmit the certificate entitlement license by transmitting a certificate entitlement license response message that includes at least one selected from a group consisting of a certificate entitlement license identifier, a certificate entitlement license value, a certificate entitlement license validity period, the unique device identifier, the device type, and a message checksum.

* * * * *